United States Patent Office 2,912,426
Patented Nov. 10, 1959

2,912,426
SEPARATION PROCESS UTILIZING UREA PARTITION CHROMATOGRAPHY

Clarence Karr, Jr., Pittsburgh, Pa., assignor to Gulf Research & Development Company, Pittsburgh, Pa., a corporation of Delaware No Drawing. Application April 18, 1955
Serial No. 502,246

4 Claims. (Cl. 260—96.5)

This invention relates to a process for separating fluid mixtures. More particularly, it relates to an improvement in partition chromatography processes by a novel combination with certain principles of separation by adduct formation.

Partition chromatography is a method of separating fluids by distributing them between two phases, one of which is mobile and the other essentially fixed by sorption to a support. Partition chromatography, as most generally carried out, employs a column of granular adsorbent material and both the mobile phase and the fixed phase are liquids. A solvent which is to form the fixed phase is adsorbed on the column of adsorbent particles. The liquid mixture to be separated is then introduced to the column and thereafter another solvent, which is to form the mobile phase and which is immiscible or only partly miscible with the first-mentioned solvent, is added to the column. Fractionation of the charge mixture occurs as its components are partitioned between the first solvent immobilized on the adsorbent and the second solvent or eluant which is unadsorbed and forms a mobile phase flowing through the column. Partition chromatography carried out in this manner is a multi-stage equilibrium separation process.

The method of the present invention provides an improvement in partition chromatography, based upon a novel combination of certain principles of partition chromatography, having its advantages of multi-stage separation, with the principles of separation by adduct or molecular complex formation. It is known that some mixtures of organic compounds can be separated by a process of selective adduct formation. For example, in a known method of separating a liquid mixture of straight chain and branched chain hydrocarbons, a batch of the mixture is mixed with an aqueous or alcoholic solution of urea. The straight chain compounds of the mixture preferentially form crystalline adducts or complexes with the urea. An equilibrium concentration of the solid adduct is formed in the liquid mixture and is separated from the non-adducted liquid by filtration or by centrifuging. The solid adducts are unstable and can easily be resolved into urea and the straight chain compound by heating or by contact with a hot solvent. The degree of separation of the branched chain and straight chain compounds in this batch operation will be governed by the equilibrium concenrations for the particular substances. The non-adducted liquid after contact with the urea will still contain a considerable amount of material capable of forming adducts with urea. For more complete separation of the straight chain and branched chain compounds the non-adducted liquid must be contacted with urea in several more stages. Accordingly, this batch procedure has the disadvantage of being a single stage equilibrium process.

There has also been proposed a urea adduct separation process in which the liquid to be separated is poured through a bed of solid urea. This process is to some extent a multi-stage process because, as the mixture drains through the bed, it becomes less concentrated in the substance capable of forming the adduct and the adduction equilibrium favors further adduction of the substance with urea. However, a procedure which uses a bed of solid urea particles has important drawbacks. In the first place, the bed is likely to be clogged by the urea adduct crystals. The crystalline particles have little resistance to abrasion and rapidly become powdered. The powdered complex will pack into the intersticial spaces in the bed and clog the channels for liquid flow. This makes it difficult or impossible for liquid to flow through the bed. There is however an even more serious disadvantage. By merely percolating a mixture through a bed of solid urea it is impossible to recover more than one component of the mixture in a pure form. In a percolation-type process, some of the compound or compounds which do not form adducts can be recovered in the first liquid issuing from the bed reasonably free of compounds that do form adducts but complete recovery of such material by percolation or frontal-analysis is impossible. Some of the non-adducting material will remain distributed by occlusion throughout the bed of solids. This material cannot be recovered separately from adductable material simply by continuing to percolate the mixture of adductable and non-adductable components through the bed.

My novel process avoids the disadvantages of known separation methods based on adduct formation by combining the adduct-forming technique with the principles of partition chromatography. In this way a multi-stage adduction equilibrium is made possible and a high degree of separation of adducting and non-adducting components of a mixture can be achieved.

The process of my invention in general comprises contacting a column of solid adsorbent material with a solution of a complex-forming or adducting agent. Thereafter, the adsorbent column is contacted with a fluid mixture of adducting and non-adducting compounds in an amount insufficient to penetrate the entire length of the adsorbent column. The column is then contacted with a mobile fluid which removes one of the components of the feed mixture from the column substantially entirely separated from the other components.

In a preferred embodiment of the process the fluid with which the column is contacted after the introduction of the feed mixture is an eluant liquid or wash liquid which is a solvent for the non-adducting component of the feed mixture and which will not decompose the adduct. The non-adducting component is recovered from the column with the eluant and the column is then contacted with a liquid which will decompose the adduct and displace adsorbed substances from the adsorbent column.

A further understanding of the process of my invention can be obtained from the following detailed examples of the separation of specific liquid mixtures by my process.

EXAMPLE 1

For separating a liquid mixture of decahydronaphthalene and n-hexadecane, Davison grade 70 silica gel, particle size from 100 to about 20 mesh, was used to prepare the adsorbent-adduction column. The silica gel was packed dry into a column 60 cm. long and 1.2 cm. in diameter and was saturated with a solution of urea in methanol. The excess solution occluded in intersticial spaces of the silica gel particles was drained from the top of the column. Then the charge mixture consisting of 0.9686 gram of decahydronaphthalene and 0.3630 gram of n-hexadecane at a temperature of about 25° C. was fed to the top of the column. This amount of charge was sufficient to penetrate only about ¼ of the length of the column. Next n-pentane at a temperature of about 25° C. was fed to the top of the column as an eluant, in two portions of about 4 ml. each, until a solution of n-pentane and material which did not adduct with the urea began to issue from the bottom. Another portion of n-pentane, about 8 ml., was then forced through the column under a few pounds of nitrogen pressure so as to elute or wash out substantially all of the unadducted component of the charge mixture. Care was taken to use enough pentane for complete elution of the column without using so much as to dissociate the urea adduct. The eluate, that is, the liquid washed out with the pentane, was collected and then water, at about 25° C., was percolated through the column to dissociate the adduct. This was followed by washing the column again with n-pentane at about 25° C. to recover the released hydrocarbon (n-hexadecane), only a small amount of which was washed from the column by the water. After following this procedure there were two collected liquid fractions, a first pentane eluate, obtained before the water wash, which was rich in decahydronaphthalene, and a second pentane eluate, obtained after the water wash, which was rich in n-hexadecane. These fractions were evaporated under a hood to remove the pentane. The resulting products were weighed and their refractive indices measured. Table I below gives the results for comparison with the weights and refractive indices of the feed components.

*Table I*

|  | Wt., g. | $n_D^{25}$ |
|---|---|---|
| First Product | 0.9864 | 1.4637 |
| Decahydronaphthalene | 0.9686 | 1.4771 |
| Second Product | 0.2931 | 1.4289 |
| n-hexadecane | 0.3630 | 1.4324 |

Table I shows that the refractive index of the second product was a little lower than the refractive index of the pure n-hexadecane component of the charge mixture. It is clear therefore that the product was substantially free of decahydronaphthalene which has a higher refractive index. The fact that the refractive index of the second product was even somewhat lower than the refractive index for pure n-hexadecane was caused by there being some pentane in the product which was not removed by evaporation.

EXAMPLE 2

A mixture containing 0.3039 gram of n-hexadecane and 1.0102 grams of decahydronaphthalene was separated by my process using silica gel as the adsorbent and urea as the adducting agent. The procedure was the same as for Example 1 with the exception that the urea was applied to the column of silica gel in a solution of 90 percent methanol and 10 percent water. The results of the separation process in terms of weight yield of the two products and the refractive indices of the products as compared with the pure components of the feed mixture are given in Table II below.

*Table II*

|  | Wt., g. | $n_D^{25}$ |
|---|---|---|
| First Product | 0.9619 | 1.4681 |
| Decahydronaphthalene | 1.0102 | 1.4771 |
| Second Product | 0.2597 | 1.4292 |
| n-hexadecane | 0.3039 | 1.4324 |

Table II, like Table I, shows that the second product was recovered as substantially pure n-hexadecane substantially free from the decahydronaphthalene which has a higher refractive index. As in the results of Example 1, the refractive indices of the products somewhat below that of the pure feed components is caused by the presence of some unevaporated pentane in each of the products.

EXAMPLE 3

I have separated into two fractions by my process a straight-run Ordovician kerosene, boiling range 360° to 493° F., following the procedure of Example 2. The weights, refractive indices, and crystallization points of the kerosene charge and of the two products are given in Table III.

*Table III*

|  | Wt., g. | $n_D^{25}$ | Crystallization Point, ° F. |
|---|---|---|---|
| Kerosene Charge | 1.3545 | 1.4395 | −29 |
| First Product | 1.1177 | 1.4403 | −45 |
| Second Product | 0.2715 | 1.4199 | +8 |

From the refractive indices of pure n-paraffin compounds of boiling points corresponding approximately to the upper and lower limits of the boiling range of the kerosene, it can be estimated that the n-paraffins in the kerosene ranged in refractive index from 1.41 to 1.43 and that the average was about 1.42. Accordingly, Table III indicates that the second product (refractive index 1.4199) was composed substantially entirely of pure n-paraffins. This product had the mild, characteristic odor of the higher molecular weight paraffins. The first product had the same strong odor as the kerosene charge. The crystallization points, i.e., the temperatures at which crystals first formed, also support these observations.

EXAMPLE 4

I have separated a mixture of n-heptyl sulfide and phenyl sulfide by my process. The procedure was substantially the same as in Example 1. Two product fractions were recovered. Table IV below gives the weight yields and refractive indices of the products and the components of the charge mixture.

*Table IV*

|  | Wt., g. | $n_D^{25}$ |
|---|---|---|
| Phenyl Sulfide | 0.5904 | 1.6301 |
| First Product | 0.5273 | 1.6203 |
| n-Heptyl Sulfide | 0.2232 | 1.4586 |
| Second Product | 0.2713 | 1.4949 |

It can be assumed that the refractive index of a mixture of equal volumes of phenyl sulfide and n-heptyl sulfide is approximately midway between the refractive indices of the pure compounds. With this reasonable assumption, the refractive indices in Table IV indicate that the first product contained about 96 weight percent phenyl sulfide as compared to 73 percent in the charge and that the second product contained about 74 weight percent n-heptyl sulfide as compared to 27 percent in the charge. This separation would be difficult to accomplish by distillation because of the close boiling points of the liquids. At atmospheric pressure the phenyl sulfide boils at 295° C. and the n-heptyl sulfide at 298° C.

The examples above and most of the description which follows relate to the separation of liquid mixtures and to the partition of the components of a mixture between a liquid fixed phase containing the adducting agent and a liquid mobile phase formed by a liquid eluant. However, my process can also be applied to the separation of gaseous mixtures. Therefore, in referring to my process in its broader scope I use the term "fluid mixture" to designate the feed mixture. In separating gases by my process the mobile phase can also be a gas rather than a liquid. In this modification of my process, certain principles of the procedure known as "gas-liquid partition chromatography" are used. It is also possible, as I will mention more fully hereinafter, for the adducting agent which forms the fixed phase in my process, to be in the solid state for the separation of either liquid or gaseous feed mixtures.

In the examples above I have described the use of silica gel as the adsorbent and urea as the adducting agent. However, there are a number of other materials suitable for these purposes. In general, any of the porous solids known in the art to be useful for partition chromatography can be used as adsorbents in my process. These include such materials as activated alumina, activated bauxite, silica-alumina adsorbents, fuller's earth, magnesium oxide, activated carbon and the like.

The adsorbent is used in a granular form which is freely permeable to fluids. The particle size is important, particularly when the adducts which form in the adsorbent bed are solids. The adducting agent is applied to the adsorbent by contacting it with a solution of the adducting agent. This solution forms a film on the adsorbent particles. When the mixture being separated flows through the bed, the adductable component of the mixture forms an adduct (usually solid) with the adducting agent and the film on the particles expands. If the adsorbent particles are very small, the expansion of the adsorbed film will close the intersticial passages in the column and impede fluid flow. To avoid this difficulty, the adsorbent particles should be no smaller than about 200 mesh, that is, they should not pass through a 200 mesh screen which has 0.074 mm. openings. However, if the particles are too large, the intersticial passages will be large and will form channels through which the feed mixture can flow without making contact with the adducting agent. Therefore, the particles should be no larger than about 20 mesh, that is, they should all pass through a 20 mesh screen which has 0.84 mm. openings.

The preferred adducting agents or complex-forming materials for my process are urea and analogous compounds such as thiourea, selenourea and telurourea. They are particularly useful for separation of straight chain compounds from branched chain compounds. However, in separating other liquid mixtures it may be desirable to use other adducting agents. A large number of adducting agents known for their ability to form readily decomposable complexes or adducts with particular types of compounds can be used in my process. The following can be cited as illustrative. Certain nitro compounds such as picric acid, and s-trinitrobenzene form complexes with aromatic compounds and can be used in my process for the separation of aromatics from non-aromatics or for the separation of mixtures of aromatic compounds. Other complexing agents for separating mixtures containing aromatic compounds include maleic anhydride, oxalyl chloride, s-tricyanobenzene, iodine, iodine monochloride, cyanogen iodide, chloroform, carbon tetrachloride, methylene chloride, hydrogen fluoride, a hydrogen fluoride-boron trifluoride mixture, a hydrogen chloride-aluminum trichloride mixture, sulfuric acid, aluminum chloride, ferric chloride, antimony trichloride, benzoquinone, chloranil, sulfur dioxide, thionyl chloride, triphenylmethane, diaminotriphenylmethane, etc.

Suitable solvents for applying a urea-type adducting agent to the adsorbent include water, methanol, ethanol, and other low molecular weight alcohols, acetic acid and other low molecular weight carboxylic acids, and mixtures of any of these types of solvents. In separating mixtures of organic liquids it is preferred to use an organic solvent for the adducting agent instead of water because it is easier for the adductable component of a mixture of organic compounds to penetrate organic solvents rather than water. However, some natural mixtures contain solutizing components, and for these water can be just as satisfactory as organic solvents.

The concentration of the urea or other adducting agent in the solution with which the adsorbent is contacted can vary considerably. It is preferred, however, to use a saturated solution of adducting agent so as to get a high concentration of the adducting agent on the adsorbent. It is even possible to use a suspension of small crystals of the adducting agent in a saturated solution. For example, in preparing a silica gel-urea column, a suitable procedure is to form a slurry of silica gel with a saturated solution of urea containing small urea crystals. The slurry is packed into a column and the occluded liquid is drained off. A film of adsorbed saturated solution of urea and small crystals of urea is left on the silica gel. Because of the high concentration of urea on the silica gel, the adduction capacity of the column will be large as compared with a column prepared by treating the silica gel with an unsaturated solution of urea.

I have described a preferred procedure, in accordance with the invention, in which the adducting agent is immobilized on an adsorbent column in the liquid phase, specifically by adsorbing a solution of urea on the adsorbent. If the adducting agent is liquid under the conditions of the process it can be applied to the adsorbent as a liquid without a solvent. When the process of the invention is carried out in either of these ways, the components of the charge mixture are partitioned between the fixed liquid phase adducting agent and the mobile liquid or gaseous eluant which is flowed through the column. However, it is also possible in accordance with the invention for the adducting agent to be in the solid state and fixed to the adsorbent. This can be accomplished by treating the adsorbent with a solution of an adducting agent which is a solid under the conditions of the process and evaporating the solvent to leave a thin solid layer of adducting agent on the adsorbent. Then when the column is contacted with a fluid feed mixture and an eluant, the components of the mixture are partitioned between the solid phase adducting agent and the fluid eluant.

In my process it is important to avoid separation by percolation or, as it is also called, frontal analysis. I have mentioned above that in percolation a liquid mixture is merely drained through an adsorbent bed without regard to a maximum charge to adsorbent ratio and no eluant is used. The feed mixture is supplied continuously to the top of the column while product is withdrawn from the bottom. It is possible by this method to recover part of one component of the feed in a fairly pure state. This will be the material which is least strongly held in the column and which issues first from the bottom of the column. However, as the column becomes saturated the product will become increasingly rich in material which in my type of process is held up in the column. It will not be possible to recover the more strongly held components of the feed free from the less strongly held components. My process, which uses the principles of partition chromatography, differs markedly from a percolation type of process and makes possible a substantially complete separation of components of the feed mixture. Two important features of my process contribute to this result, namely, the observance of a maximum charge to adsorbent ratio and the use of eluant or displacer fluids to remove feed components from the bed.

The maximum ratio of charge to adsorbent for my process can be expressed as the extent to which the charge penetrates the adsorbent-adduction bed. In my process the charge or feed mixture is introduced to the bed or column in an amount which is insufficient to penetrate the entire length of the adsorbent bed and preferably in an amount which penetrates no more than about 90 percent of the length of the bed. There is no critical lower limit for the amount of mixture that can be charged. However, to use the capacity of the column most efficiently the amount should not be too small. In general, the amount of charge mixture should be that which will penetrate from about 5 to about 90 percent of the adsorbent-adduction bed.

After introducing the limited amount of charge the column is contacted with a mobile fluid which will selectively remove one of the desired products. As I have mentioned, this mobile fluid can be a gas if the feed mixture is a mixture of gases, but in the usual application of my process for the separation of liquid mixtures, the mobile fluid phase is a liquid. The liquid can be an eluant or wash liquid which washes non-adducted material from the column or it can be a displacer liquid which has a stronger affinity for the adsorbent than the solvent of the adducting agent solution and which therefore displaces everything from the column including non-adducted material, adducted material and the solvent for the adducting agent. If a displacer liquid is used, the various materials issue successively from the bottom of the column, those which are least strongly held appearing first and the most strongly held appearing last.

My preferred procedure is to use an eluant liquid. The eluant liquid is selected for its ability to wash only non-adducted liquid from the column and leave substantially all of the adducted material in the column. The adducted material can then be removed in another stage as will be described below.

In using the elution technique in my process it is important to use eluants and elution temperatures which will not cause the adduct in the adsorbent column to dissociate. The eluant must not be a substance which forms adducts with the adducting agent more readily than the components of the mixture being separated. For separating straight-chain and branched-chain organic compounds, using urea as the adducting agent, suitable eluants are the low molecular weight paraffin liquids, such as n-pentane, n-hexane and their branched-chain isomers and other low molecular weight hydrocarbons such as benzene, toluene, xylene, etc. It is generally not advisable to use n-paraffins of higher molecular weight than hexane when urea is used as the adducting agent because urea forms adducts with n-paraffins containing more than about 7 or 8 carbon atoms. Other adducting agents have different properties and can be used with different eluants. For example, thiourea forms adducts most readily with branched-chain compounds. Therefore, n-paraffin eluants of reasonably long chain length, for example n-heptane and n-octane, can be used as eluant liquids when thiourea is used as the adducting agent.

As I have mentioned, the temperature during the elution stage must be below the dissociation temperature of the adducts or complexes. The complexes formed by urea with petroleum-type hydrocarbons are usually stable at room temperature and at temperatures as high as 70° C. The minimum temperature of the process will be governed by the temperatures at which the components of the charge become solid or inconveniently viscous. For separating mixtures of petroleum-type liquid compounds it is preferred to contact the adsorbent-adduction column with an eluant at room temperature or slightly above.

After the eluant has been flowed through the separation column to remove all or substantially all of the non-adducted components of the charge mixture from the column, the column is contacted with a fluid which will dissociate the adduct. This can be a polar liquid such as water or an alcohol or a hot hydrocarbon liquid such as pentane, hexane or benzene. If the hydrocarbons are solvents for the adducted component of the charge, they will wash such material from the column while leaving behind the urea or other adducting agent which is insoluble in the hydrocarbon liquid. The column will then be ready for another separation cycle.

I have described using my process for separating such mixtures as n-hexadecane and decahydronaphthalene, n-heptyl-sulfide and phenyl sulfide, and the straight and branched-chain constituents of kerosene. The process can be applied to the separation of many other branched-chain and straight-chain mixtures or to the separation of any other types of liquid or gaseous mixtures of which one component preferentially forms an adduct with an adducting agent such as urea which can be adsorbed in an adsorbent bed. When applied on a large scale, the process can, for example, be very advantageous for improving the cetane rating of diesel fuels. Diesel fuels with high cetane rating have high concentrations of straight-chain hydrocarbons. My process can produce such fuels by reducing the concentration of branched-chain hydrocarbons in the fuel.

Obviously many modifications and variations of the invention as hereinbefore set forth may be made without departing from the spirit and scope thereof and therefore only such limitations should be imposed as are indicated in the appended claims.

I claim:

1. A method of separating a liquid mixture of organic compounds at least one component of which is an adducting compound that preferentially forms an adduct with an organic compound adducting agent selected from the group consisting of urea, thiourea, telurourea and selenourea and another component of which is a non-adducting compound which comprises introducing the mixture into an adsorbent-adduction column of granular adsorbent particles which have been saturated with a solution of said adducting agent, the amount of said mixture introduced into said column being insufficient to penetrate the entire length of the column, at a temperature below the disassociation temperature of the adduct formed by said adducting agent and said adducting component introducing into the column an eluant liquid which does not readily adduct with said adducting agent and which is a solvent for a non-adducting component of the feed mixture, recovering from the column a solution of the eluant liquid and substantially all of said non-adducting component, introducing into the column a liquid that dissociates the adduct formed by the adducting agent and an adducting component of the feed mixture and recovering such adducting component from the column.

2. A method of separating a liquid mixture of organic compounds, at least one component of which is an adducting compound that preferentially forms an adduct with an adducting agent selected from the group consisting of urea, thiourea, telurourea, and selenourea and another component of which is a non-adducting compound, which comprises introducing the mixture into a column of granular silica gel particles that have been saturated with a solution of said adducting agent, the amount of said mixture introduced to said column being insufficient to penetrate the entire length of the column, at a temperature below the disassociation temperature of the adduct formed by said adducting agent and said adducting component introducing into the column an eluant liquid which does not readily adduct with said adducting agent and which is a solvent for a non-adducting component of the feed mixture, and recovering from the column a solution of the eluant liquid and substantially all of said non-adducting component.

3. A method of separating a liquid mixture of straight-chain and branched-chain organic compounds which comprises introducing the mixture into a column of granular silica gel particles of from 20 to 200 mesh particle size that have been saturated with an alcoholic solution of urea, the amount of said mixture introduced into said column being insufficient to penetrate more than about 90 percent of the length of the column, introducing into said column as an eluant liquid at a temperature below about 70° C., a liquid paraffin compound having no more than about 6 carbon atoms, recovering from the column an eluate solution containing said paraffin liquid and substantially all of the branched-chain components of the feed mixture, introducing into the column at a temperature above about 70° C. a hydrocarbon liquid which is a solvent for the straight-chain components of the feed mixture and a non-solvent for urea, and recovering from the column said hydrocarbon liquid and substantially all of the straight-chain components of the feed mixture.

4. A method of separating a fluid mixture of organic compounds at least one component of which is an adducting compound that preferentially forms an adduct with an adducting agent selected from the group consisting of urea, thiourea, telurourea and selenourea and another component of which is a non-adducting compound, which comprises introducing said mixture into a column of granular particles having a liquid coating of a solution of said adducting agent, the amount of said mixture introduced to said column being insufficient to penetrate the entire length of the column, thereafter at a temperature below the disassociation temperature of the adduct formed by said adducting agent and said adducting component introducing into the column an eluant liquid which does not readily adduct with said adducting agent and which is substantially immiscible with the solvent for said adducting agent but which is a solvent for a non-adducting component of the feed mixture, and recovering from the column a solution of the eluant liquid and said non-adducting component.

References Cited in the file of this patent
UNITED STATES PATENTS

| | | |
|---|---|---|
| 2,574,434 | Greentree et al. | Nov. 6, 1951 |
| 2,658,060 | Arnold et al. | Nov. 3, 1953 |
| 2,672,457 | Weedman | Mar. 16, 1954 |
| 2,716,113 | Axe | Aug. 23, 1955 |
| 2,743,818 | Higuchi | May 1, 1956 |
| 2,776,250 | Capell et al. | Jan. 1, 1957 |

OTHER REFERENCES

Mantell: "Adsorption," 2nd ed., 1951, McGraw-Hill Book Co., Inc., New York, pages 531–534.